(12) United States Patent
Nagami et al.

(10) Patent No.: US 10,124,425 B2
(45) Date of Patent: Nov. 13, 2018

(54) MILLING CUTTING INSERT

(71) Applicant: SUMITOMO ELECTRIC HARDMETAL CORP., Itami-shi, Hyogo (JP)

(72) Inventors: Yoshinari Nagami, Itami (JP); Atsuhiko Maeta, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 173 days.

(21) Appl. No.: 14/382,045

(22) PCT Filed: Oct. 15, 2013

(86) PCT No.: PCT/JP2013/077884
§ 371 (c)(1),
(2) Date: Aug. 29, 2014

(87) PCT Pub. No.: WO2014/080708
PCT Pub. Date: May 30, 2014

(65) Prior Publication Data
US 2015/0043981 A1    Feb. 12, 2015

(30) Foreign Application Priority Data

Nov. 26, 2012    (JP) .................................. 2012-257204

(51) Int. Cl.
*B23C 5/20*    (2006.01)
*B23C 5/06*    (2006.01)

(52) U.S. Cl.
CPC ................ *B23C 5/207* (2013.01); *B23C 5/06* (2013.01); *B23C 2200/0455* (2013.01);
(Continued)

(58) Field of Classification Search
CPC . Y10T 407/23; Y10T 407/235; Y10T 407/24; Y10T 407/245; B23C 2200/368;
(Continued)

(56) References Cited

U.S. PATENT DOCUMENTS 3,821,836 A * 7/1974 Ohtsu ................... B23B 27/145
407/114
4,616,962 A 10/1986 Ushijima et al.
(Continued)

FOREIGN PATENT DOCUMENTS

CN    102076450 A    5/2011
CN    102413976 A    4/2012
(Continued)

OTHER PUBLICATIONS

English translation of JP-2008142870-A, Jun. 2008.*
(Continued)

*Primary Examiner* — Alan Snyder
(74) *Attorney, Agent, or Firm* — Oliff PLC

(57) ABSTRACT

To reduce burrs that may be formed at a corner portion of a machined surface in a face milling process, there is provided a cutting insert that does not tend to form burrs. A milling cutting insert includes cutting edges provided as ridges each defined by an upper or lower face and a side face that intersect each other, the cutting edges including a flat cutting edge. The cutting edge include a major cutting edge provided between adjacent ones of corner portions, the flat cutting edge provided at the corner portion, and a minor cutting edge provided between the major cutting edge and the flat cutting edge. A surface roughness of a side face that is continuous with the major cutting edge is higher than a surface roughness of a side face that is continuous with the minor cutting edge.

7 Claims, 3 Drawing Sheets

(52) U.S. Cl.
CPC .. *B23C 2200/0461* (2013.01); *B23C 2200/12* (2013.01); *B23C 2200/201* (2013.01); *B23C 2200/208* (2013.01); *B23C 2200/28* (2013.01); *B23C 2200/368* (2013.01); *Y10T 407/23* (2015.01)

(58) Field of Classification Search
CPC ............ B23C 2200/12; B23C 2200/08; B23C 2200/208; B23B 2200/12; B23B 2200/08
See application file for complete search history.

(56) References Cited

U.S. PATENT DOCUMENTS

| | | | | |
|---|---|---|---|---|
| 5,145,295 | A | * | 9/1992 | Satran .................... B23C 5/2213 407/113 |
| 5,365,805 | A | * | 11/1994 | Pantzar ................... B23C 5/202 407/114 |
| 5,454,671 | A | * | 10/1995 | Qvarth .................... B23C 5/202 407/113 |
| 6,004,081 | A | * | 12/1999 | Hellstrom ............. B23C 5/2221 407/101 |
| 6,161,990 | A | * | 12/2000 | Oles ....................... B23B 27/145 407/113 |
| 6,171,031 | B1 | * | 1/2001 | LaFlamme ............ B23B 27/141 407/113 |

FOREIGN PATENT DOCUMENTS

| | | | | |
|---|---|---|---|---|
| EP | 0160278 | A2 | 11/1985 | |
| EP | 1872889 | A1 | 1/2008 | |
| JP | A-07-246505 | | 9/1995 | |
| JP | A-08-052611 | | 2/1996 | |
| JP | 2000288803 | A * | 10/2000 | ............. B23B 27/14 |
| JP | 2005238367 | A * | 9/2005 | ............... B23C 5/20 |
| JP | 2005279822 | A * | 10/2005 | ............. B23P 15/28 |
| JP | 2008142870 | A * | 6/2008 | ............... B23C 5/06 |
| JP | A-2008-142870 | | 6/2008 | |
| WO | 2009/157603 | A1 | 12/2009 | |
| WO | WO 2009157603 | A1 * | 12/2009 | ............. B22F 3/162 |
| WO | 2010/147157 | A1 | 12/2010 | |

OTHER PUBLICATIONS

Nov. 27, 2015 Search Report issued in European Patent Application No. 13857233.4.

Kalpakjian Serope, "Manufacturing Processes for Engineering Materials," 1984, Addison-Wesley, Reading, Massachusetts, USA, XP002750583, p. 574, Fig. 9.12.

Nov. 26, 2013 International Search Report issued in International Application No. PCT/JP2013/077884.

Aug. 17, 2015 Office Action issued in Chinese Patent Application No. 201380016858.0.

* cited by examiner

Prior Art

MILLING CUTTING INSERT

TECHNICAL FIELD

The present invention relates to milling cutting inserts to be included in milling cutters, and more specifically to a milling cutting insert having a function of suppressing beforehand the formation of burrs that may occur at a corner portion of a machined surface in a face milling process.

BACKGROUND ART

In a face milling process, burrs may be formed at a corner portion of a machined surface (a corner portion formed between an end surface of a workpiece toward which the workpiece is cut through and the machined surface) during the process. Known technologies provided with a deburring function include, for example, a rotary cutting tool disclosed by PTL 1 listed below.

The rotary cutting tool disclosed by PTL 1 includes, in addition to a major cutting insert that is responsible for major cutting, a so-called circular cutting insert having a circular cutting edge. Burrs, if formed, are removed by the circular cutting insert.

CITATION LIST

Patent Literature

PTL 1: Japanese Unexamined Patent Application Publication No. 08-52611

SUMMARY OF INVENTION

Technical Problem

The rotary cutting tool disclosed by PTL 1 removes burrs that have been formed, rather than suppressing the formation of burrs. Hence, such a tool needs to be used as a combination of a major cutting insert and a deburring-exclusive cutting insert. That is, two kinds of cutting inserts are used, which is inevitably disadvantageous in terms of productivity, cost, controlling the inventory of cutting inserts, and so forth.

Moreover, there is an unavoidable difference in the life of the cutting edge between the major cutting insert and the deburring-exclusive cutting insert. In a case of a cutting tool including a combination of two kinds of cutting inserts, if the life of the cutting edge of one of the cutting inserts runs out, the other cutting insert is also replaced, in general.

Therefore, the remaining life of the other cutting insert becomes wasteful, and the utilization efficiency is reduced. Consequently, an economic loss occurs, leading to a high tool cost.

The present invention is to suppress the formation of burrs at a corner portion of a machined surface in a face milling process and to provide a cutting insert that does not tend to form burrs.

Solution to Problem

To solve the above problem, the present invention provides a milling cutting insert including cutting edges provided as ridges each defined by an upper or lower face and a side face that intersect each other, the cutting edges including a flat cutting edge provided at one of corner portions. The milling cutting insert is characterized as follows.

The cutting edges include a major cutting edge provided between adjacent ones of the corner portions, the flat cutting edge provided at the corner portion, and a minor cutting edge provided between the major cutting edge and the flat cutting edge and inclining with respect to the flat cutting edge. A surface roughness of a side face that is continuous with the major cutting edge is higher than a surface roughness of a side face that is continuous with the minor cutting edge.

In the cutting insert, it is preferred that the side face that is continuous with the major cutting edge be an unground surface that is left as a sintered surface, and that an arithmetic mean roughness of the side face that is continuous with the minor cutting edge be Ra 0.1 μm to 0.3 μm. It is also preferred that an inclination angle α of the minor cutting edge with respect to the flat cutting edge be 10° to 30°.

It is also preferred that the milling cutting insert be an edge-interchangeable cutting insert whose upper and lower faces each have a substantially polygonal shape. In such an edge-interchangeable cutting insert, the major cutting edge, the flat cutting edge, and the minor cutting edge are one of a plurality of major cutting edges, one of a plurality of flat cutting edges, and one of a plurality of minor cutting edges, respectively. Furthermore, positions of the respective cutting edges are interchangeable by changing the corner to be used.

Advantageous Effects of Invention

The cutting insert according to the present invention includes the minor cutting edge between the major cutting edge and the flat cutting edge. Furthermore, the surface roughness of the side face on the side of the minor cutting edge and the surface roughness of the side face on the side of the major cutting edge are different from each other. Therefore, chips generated by forming a wall surface corresponding to a lateral side portion with the major cutting edge are broken into pieces without being fed toward a machined surface corresponding to a bottom surface.

If chips generated by forming the wall surface corresponding to the lateral side portion of the workpiece with the major cutting edge are fed toward the machined surface corresponding to the bottom surface, burrs are formed at a corner portion of the machined surface corresponding to the bottom surface. The cutting insert according to the present invention includes the minor cutting edge between the major cutting edge and the flat cutting edge. The presence of the minor cutting edge suppresses the probability that the chips generated by forming the wall surface corresponding to the lateral side portion of the workpiece may be fed toward the machined surface corresponding to the bottom surface.

The angle formed between the minor cutting edge and the flat cutting edge is smaller than the angle formed between the flat cutting edge and the major cutting edge. Therefore, chips generated by the minor cutting edge tend to curl toward a direction away from the corner of the machined surface.

Moreover, since the surface roughness of the side face that is continuous with the major cutting edge and the surface roughness of the side face that is continuous with the minor cutting edge are different from each other, there is a difference in sharpness between the major cutting edge and the minor cutting edge, making a difference in the state of chip generation between an area that is cut by the major cutting edge and an area that is cut by the minor cutting edge.

Hence, it is supposed that since a large distortional force is applied over the entirety of each of the chips, the chips are broken into pieces before reaching the machined surface corresponding to the bottom surface.

DESCRIPTION OF EMBODIMENTS

Figure 1:
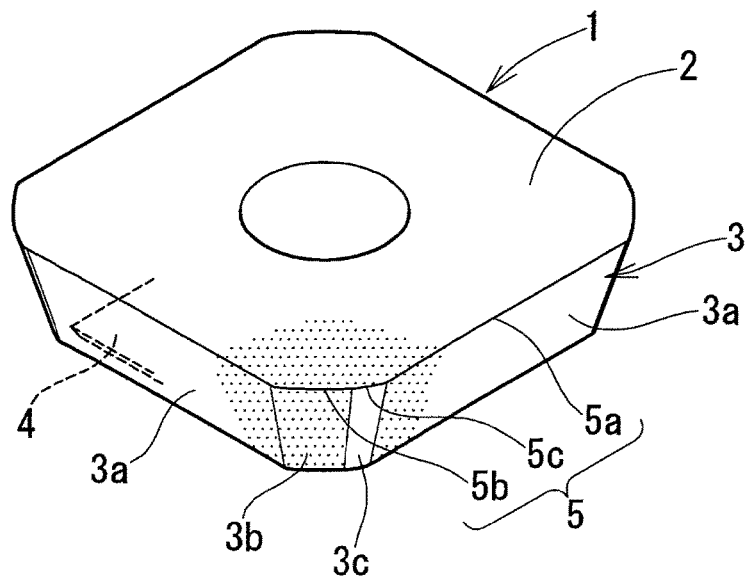
FIG. 1 is a perspective view of an exemplary cutting insert according to the present invention.
Figure 2:
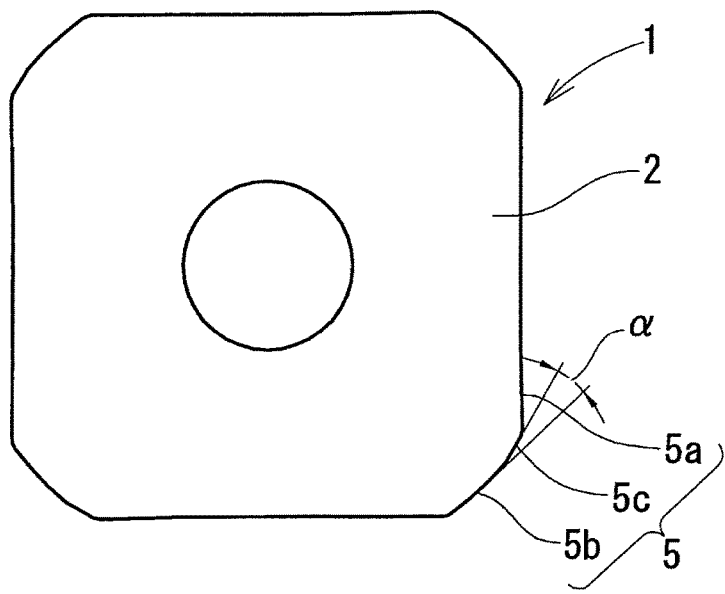
FIG. 2 is a plan view of the cutting insert illustrated in FIG. 1.
Figure 3:
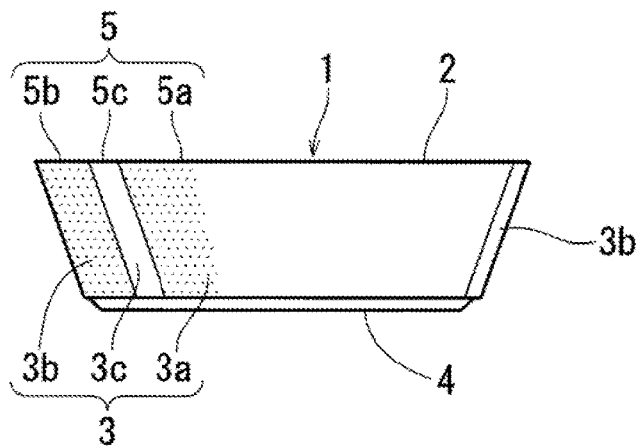
FIG. 3 is a side view of the cutting insert illustrated in FIG. 1.
Figure 4:
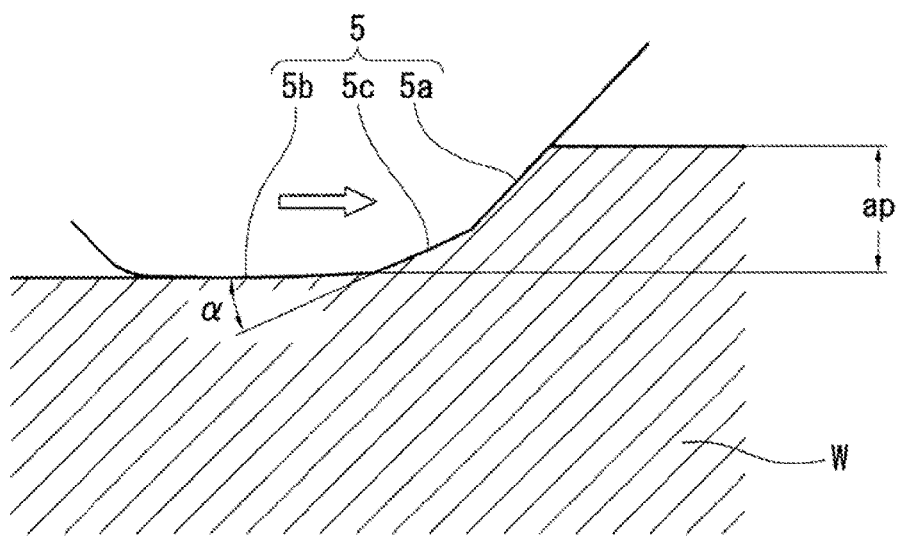
FIG. 4 illustrates the state of cutting by the cutting insert illustrated in FIG. 1.

An embodiment of the cutting insert according to the present invention will now be described with reference to the accompanying drawings including FIGS. 1 to 4. A cutting insert 1 illustrated is obtained by applying the present invention to a four-cornered, positive, edge-interchangeable cutting insert.

The cutting insert 1 includes an upper face 2 as a rake face and side faces 3 as flank faces and is mounted on a mounting seat provided around the outer circumference of the tip of a cutter body. Cutting is performed at cutting edges 5 provided as ridges each defined by the upper face 2 and a corresponding one of the side faces 3 that intersect each other. The cutting insert 1 is formed by sintering a material such as cemented carbide or cermet.

The upper face 2 and a lower face 4 each basically have a square shape. The cutting edges 5 include major cutting edges 5a each extending linearly between adjacent ones of corners, flat cutting edges 5b provided at the respective corner portions, and minor cutting edges 5c each provided between a corresponding one of the major cutting edges 5a and a corresponding one of the flat cutting edges 5b.

The major cutting edges 5a are intended for forming a wall surface corresponding to a lateral side portion of a workpiece and each incline at an angle of 45° with respect to the flat cutting edge 5b. This inclination angle is a typical value for a face milling cutter.

The flat cutting edges 5b are each a cutting edge intended for cutting off feed marks that may be formed in a bottom surface corresponding to a machined surface of the workpiece and thus improving the surface roughness of the bottom surface.

The minor cutting edges 5c each provided between the major cutting edge 5a and the flat cutting edge 5b may be linear cutting edges or approximately linear curved cutting edges.

The side faces 3 include side faces 3a that are continuous with the respective major cutting edges 5a, side faces 3b that are continuous with the respective flat cutting edges 5b, and side faces 3c that are continuous with the respective minor cutting edges 5c. The side faces 3a, the side faces 3b, and the side faces 3c form a continuous surface while being at angles with respect to one another.

Among the side faces that are continuous with the cutting edges, the side faces 3a that are continuous with the major cutting edges 5a each have higher surface roughness than the side faces 3c that are continuous with the minor cutting edges 5c.

In the cutting insert illustrated, the side faces 3a and 3b are each an unground surface that is left as a sintered surface, and the arithmetic mean roughness of the side faces 3a and 3b is expressed as Ra1=0.4 µm to 0.5 µm.

In contrast, the arithmetic mean roughness of the side faces 3c that are continuous with the minor cutting edges 5c is expressed as Ra2=0.1 µm to 0.3 µm. This surface roughness is obtained by grinding the side faces 3c.

The side faces 3a that are continuous with the major cutting edges 5a are also grindable. However, employing unground surfaces is advantageous in terms of cost and makes a large difference in surface roughness from the side faces 3c. What is important is that the surface roughness of the side faces 3a and the surface roughness of the side faces 3c are different from each other, rather than whether or not the side faces 3a or 3c are ground. The case of the side faces 3a also applies to the case of the side faces 3b that are continuous with the flat cutting edges 5b, that is, the side faces 3b may also be ground.

An appropriate inclination angle α of each minor cutting edge 5c with respect to the flat cutting edge 5b is 10° to 30°. If the inclination angle α is 10° or larger, chips generated by the minor cutting edges 5c are prevented from becoming too thin. If chips generated by the minor cutting edges 5c become too thin, burrs tend to be formed at the corner portion of the machined surface. Therefore, the inclination angle α is preferably 10° or larger.

If the inclination angle α is 30° or smaller, chips can each have a suitable width in a tool-feeding direction. If chips each have a width that is too small in the tool-feeding direction, the chips are difficult to break. Such chips generated by forming the wall surface corresponding to the lateral side portion of the workpiece tend to reach the machined surface corresponding to the bottom surface and to form burrs. If the inclination angle α is 30° or smaller, such a problem does not tend to occur.

The cutting insert to which the present invention is applied is not limited to those basically having square shapes. The cutting insert may basically have an equilateral triangular shape, a rectangular shape, or a polygonal shape having four or more corners, or may be a negative cutting insert.

The illustrated edge-interchangeable cutting insert including a plurality of major cutting edges, a plurality of flat cutting edges, and a plurality of minor cutting edges and in which the positions of the cutting edges are interchangeable by changing the corner to be used is economically superior. However, the effect of suppressing the formation of burrs is also exerted even if the cutting insert includes only one set of a major cutting edge, a flat cutting edge, and a minor cutting edge.

Example

An example will now be described.

Figure 5:
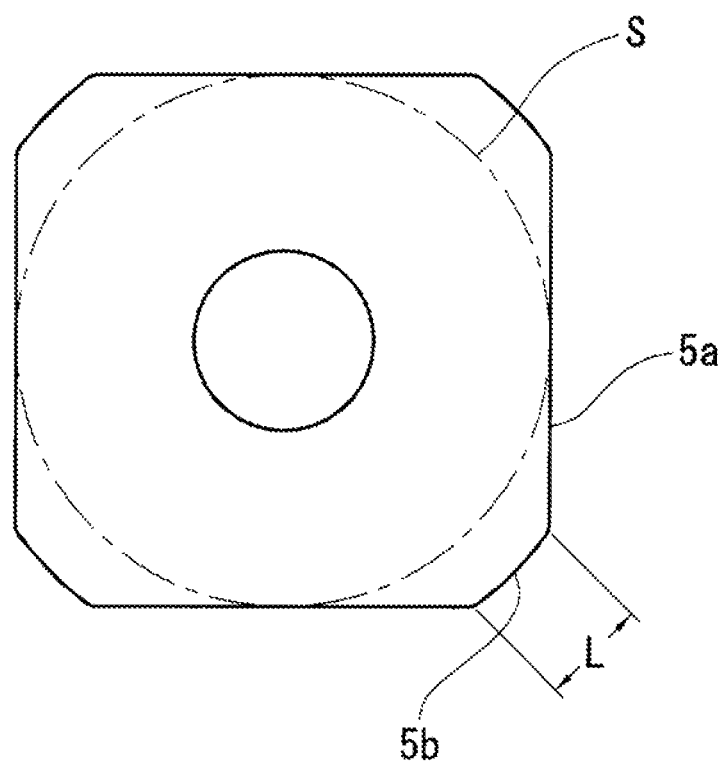
FIG. 5 is a plan view of a cutting insert including no minor cutting edges and that was used in a performance comparison test.

A cutting insert A (a comparative product), illustrated in FIG. 5, having a diameter of an inscribed circle S of 13.34 mm and a length L of each flat cutting edge 5b of 3 mm and including no minor cutting edges, and a cutting insert B (a product according to the present invention) obtained by replacing a portion of the flat cutting edge of the cutting insert A with a minor cutting edge having a length of 1 mm and being at an inclination angle α of 22°30' with respect to the flat cutting edge were experimentally prepared for comparison of the performance of suppressing the formation of burrs.

Regarding the cutting insert B, only the side faces that were continuous with the minor cutting edges were ground while the other side faces were unground surfaces that were left as sintered surfaces. Regarding the cutting insert A, all side faces were left as sintered surfaces. The arithmetic mean roughness of the side faces of the cutting insert B that were continuous with the major cutting edges and the arithmetic mean roughness of the side faces of the cutting insert B that were continuous with the minor cutting edges were Ra1=0.49 μm and Ra2=0.18 μm, respectively, on the basis of measurement with a probe-type surface roughness measuring instrument. The arithmetic mean roughness of the cutting insert A was Ra=0.49 μm for all side faces.

Using the above two kinds of cutting inserts, a workpiece W made of SUS304 was machined under the following conditions.

Conditions

Feed rate per cutting edge: Fz=0.2 mm
Cutting speed: V=200 mm/min
Level difference in workpiece (see FIG. 4): ap=3 mm Cutting was performed under the above conditions, and machined surfaces of the workpiece were visually observed. As a result, burrs were formed at a corner portion of a surface that was machined with the cutting insert A, i.e., the comparative product. In contrast, no burrs were formed on a surface that was machined with the cutting insert B, i.e., the product according to the present invention, and the machined surface was in a good condition.

The above-disclosed configuration according to the embodiment of the present invention is only exemplary, and the scope of the present invention is not limited to the above description. The scope of the present invention is defined by the claims and encompasses all changes that are made to the claims within the meanings and scope that are equivalent to the claims.

REFERENCE SIGNS LIST 1 cutting insert
2 upper face
3 side face
3a side face continuous with major cutting edge
3b side face continuous with flat cutting edge
3c side face continuous with minor cutting edge
4 lower face
5 cutting edge
5a major cutting edge
5b flat cutting edge
5c minor cutting edge
α inclination angle of minor cutting edge with respect to flat cutting edge
W workpiece

The invention claimed is:

1. A milling cutting insert comprising cutting edges provided as ridges each defined by an upper or lower face and a side face that intersect each other, the cutting edges including a flat cutting edge,
wherein the cutting edges include a major cutting edge provided between adjacent ones of the corner portions; the flat cutting edge provided at a corner portion; and a minor cutting edge provided between the major cutting edge and the flat cutting edge,
wherein a surface roughness of a side face that is continuous with the major cutting edge and a side face that is continuous with the flat cutting edge are higher than a surface roughness of a side face that is continuous with the minor cutting edge,
wherein a length of the flat cutting edge at the upper face is longer than a length of the minor cutting edge at the upper face,
wherein the side face that is continuous with the major cutting edge and the side face that is continuous with the flat cutting edge are an unground surface that is left as a sintered surface, and an arithmetic mean roughness of the side face that is continuous with the minor cutting edge is Ra 0.1 μm to 0.3 μm, and
wherein an arithmetic mean roughness of both the side face that is continuous with the major cutting edge and the side face that is continuous with the flat cutting edge are Ra 0.4 μm to 0.5 μm.

2. The milling cutting insert according to claim 1, wherein an inclination angle α of the minor cutting edge with respect to the flat cutting edge is 10° to 30°.

3. The milling cutting insert according to claim 2, wherein the major cutting edge, the flat cutting edge, and the minor cutting edge are one of a plurality of major cutting edges, one of a plurality of flat cutting edges, and one of a plurality of minor cutting edges, respectively, and the milling cutting insert is an edge-interchangeable cutting insert whose upper and lower faces each have a substantially polygonal shape and in which positions of the respective cutting edges are interchangeable by changing the corner to be used.

4. The milling cutting insert according to claim 1, wherein the major cutting edge, the flat cutting edge, and the minor cutting edge are one of a plurality of major cutting edges, one of a plurality of flat cutting edges, and one of a plurality of minor cutting edges, respectively, and the milling cutting insert is an edge-interchangeable cutting insert whose upper and lower faces each have a substantially polygonal shape and in which positions of the respective cutting edges are interchangeable by changing the corner to be used.

5. The milling cutting insert according to claim 1, wherein an inclination angle α of the minor cutting edge with respect to the flat cutting edge is 10° to 30°.

6. The milling cutting insert according to claim 5, wherein the major cutting edge, the flat cutting edge, and the minor cutting edge are one of a plurality of major cutting edges, one of a plurality of flat cutting edges, and one of a plurality of minor cutting edges, respectively, and the milling cutting insert is an edge-interchangeable cutting insert whose upper and lower faces each have a substantially polygonal shape and in which positions of the respective cutting edges are interchangeable by changing the corner to be used.

7. The milling cutting insert according to claim 1, wherein the major cutting edge inclines at an angle of 45° with respect to the flat cutting edge.

* * * * *